US010434848B2

(12) United States Patent
Nishiyama (10) Patent No.: US 10,434,848 B2
(45) Date of Patent: Oct. 8, 2019

(54) VEHICLE SUN VISOR (71) Applicant: Yazaki Corporation, Tokyo (JP)

(72) Inventor: Noritaka Nishiyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 16/111,498

(22) Filed: Aug. 24, 2018

(65) Prior Publication Data

US 2019/0061485 A1 Feb. 28, 2019

(30) Foreign Application Priority Data

Aug. 28, 2017 (JP) .................................. 2017-163005

(51) Int. Cl.
| B60J 3/02 | (2006.01) |
| B60R 16/03 | (2006.01) |
| B60Q 3/252 | (2017.01) |
| B60R 16/027 | (2006.01) |

(52) U.S. Cl.
CPC ............ B60J 3/0217 (2013.01); B60J 3/0221 (2013.01); B60Q 3/252 (2017.02); B60R 16/03 (2013.01); *B60R 16/027* (2013.01)

(58) Field of Classification Search
CPC ...... B60J 3/0217; B60J 3/0221; B60J 3/0252; B60Q 3/252
USPC ............................................ 296/97.12, 97.13
See application file for complete search history.

(56) References Cited

U.S. PATENT DOCUMENTS

| 6,139,083 | A | * | 10/2000 | Fischer | ................. B60J 3/0239 296/97.11 |
| 2002/0094719 | A1 | * | 7/2002 | Sawayanagi | ........... B60J 3/0221 439/545 |
| 2002/0149224 | A1 | * | 10/2002 | Wilson | ................... B60J 3/0217 296/97.5 |
| 2005/0104409 | A1 | * | 5/2005 | Garcia | .................. B60J 3/0221 296/97.9 |
| 2011/0260491 | A1 | | 10/2011 | Ebisuoka | |
| 2017/0021702 | A1 | * | 1/2017 | Jin | .......................... B60J 3/0221 |
| 2018/0361834 | A1 | * | 12/2018 | Nishiyama | ............. B60J 3/0217 |
| 2018/0361835 | A1 | * | 12/2018 | Kawashima | ........... B60J 3/0217 |
| 2018/0361836 | A1 | * | 12/2018 | Nishiyama | ............. B60J 3/0217 |
| 2018/0370341 | A1 | * | 12/2018 | Shimizu | ................. B60J 3/0217 |

FOREIGN PATENT DOCUMENTS

JP 2011-230559 A 11/2011

* cited by examiner

*Primary Examiner* — Jason S Morrow
(74) *Attorney, Agent, or Firm* — Sughrue Mion, PLLC (57) ABSTRACT

A vehicle sun visor includes a sun visor body, an arm including a cylindrical end portion provided with contact parts of a pair of conductors and rotatably holding the sun visor body, a mounting bracket configured to mount the arm to a vehicle, and a connector having a pair of terminals each including a contact portion configured to contact each contact part. The mounting bracket includes an arm-supporting portion supporting the cylindrical end portion. The contact parts are a pair of arcuate-plate-shaped contact parts. The pair of arcuate-plate-shaped contact parts is provided at a predetermined interval on an outer peripheral surface of the cylindrical end portion. The housing of the connector further includes a lubricating oil reservoir being disposed at a position facing to at least one arcuate-plate-shaped contact part and configured to store lubricating oil to be supplied to the at least one arcuate-plate-shaped contact part.

4 Claims, 11 Drawing Sheets

VEHICLE SUN VISOR

CROSS REFERENCE TO RELATED APPLICATIONS

This application claims the priority of Japanese Patent Application No. 2017-163005, filed on Aug. 28, 2017, the entire content of which are incorporated herein by reference.

BACKGROUND

Technical Field

The present invention relates to a vehicle sun visor with illumination arranged in the vicinity of an upper end of a front window of a front seat of a vehicle.

Related Art

Figure 11:
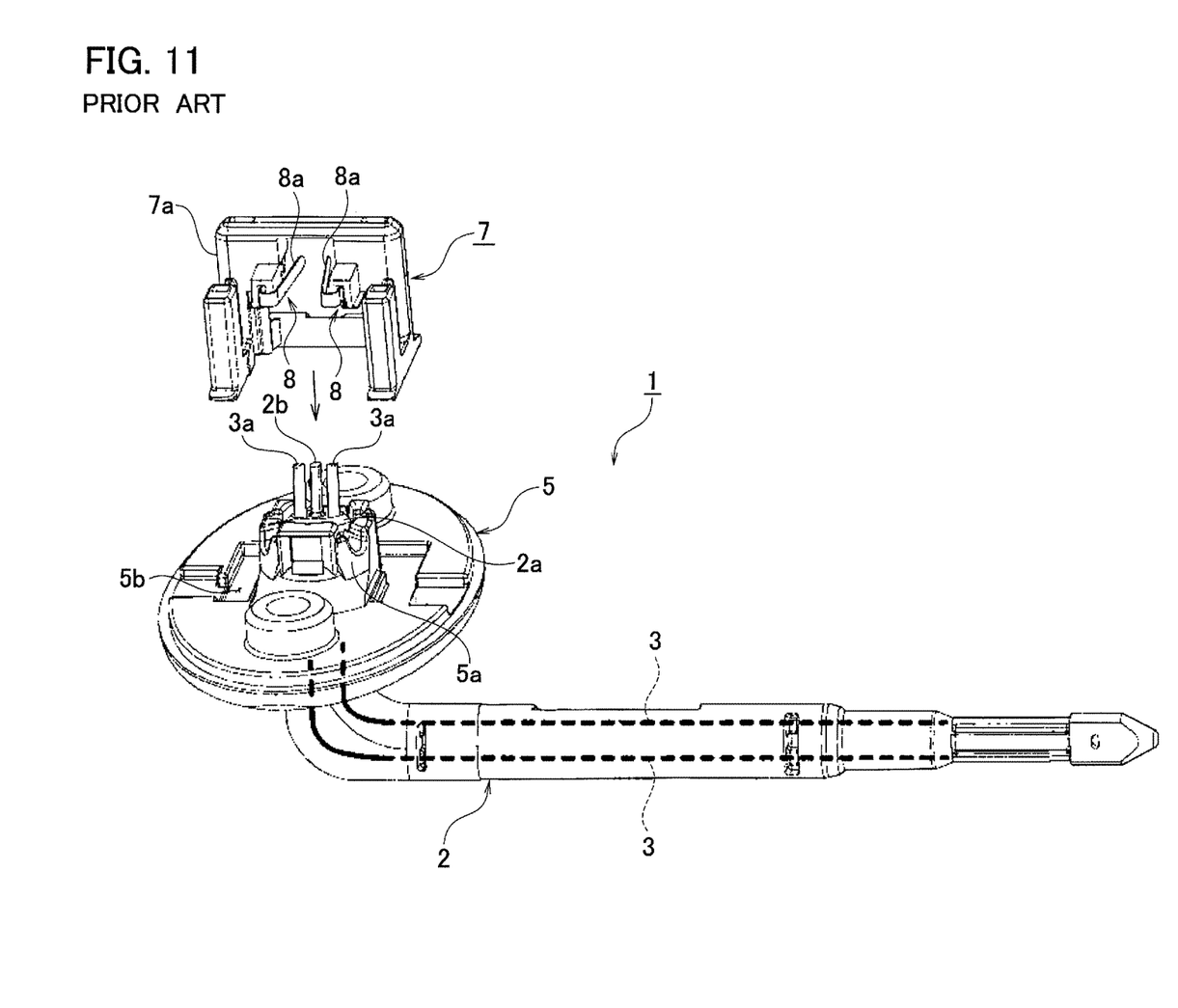
FIG. 11 is a perspective view of the periphery of a mounting bracket of a conventional vehicle sun visor.

A vehicle sun visor of this type is disclosed in JP 2011-230559 A. As shown in FIG. 11, the vehicle sun visor 1 includes a non-conductive support shaft (arm) 2 for rotatably holding a sun visor body (not shown), a mounting bracket 5 for mounting the support shaft 2 to a ceiling of a vehicle cabin (not shown), and a connector 7 detachably assembled to the mounting bracket 5 and having a pair of terminals 8 and 8 for supplying electric power.

A pair of conductors 3 and 3 extending in parallel is arranged inside the support shaft 2. Each columnar conductor end portion 3a serving as the contact parts of a pair of conductors 3 and 3 is provided on the closed upper surface of an end portion 2a toward the mounting bracket 5 so as to protrude outward. The pair of columnar conductor end portions 3a and 3a is spaced apart from each other, having a space, via a non-conductive intervening portion 2b protruding to the center of the upper surface of the end portion 2a of the support shaft 2.

The end portion 2a of the support shaft 2 is rotatably supported by a cylindrical support protrusion portion 5a of the mounting bracket 5, and a housing 7a of the connector 7 is assembled to a mounting recess portion 5b of the mounting bracket 5.

When the support shaft 2 is rotated to a first position, the pair of columnar conductor end portions 3a and 3a protruding outward from the end portion 2a contacts each spring portion 8a of the pair of terminals 8 and 8 for supplying electric power to be brought into an energized (ON) state, whereby a lighting preparation state of the illumination lamp of the sun visor body is formed.

When the support shaft 2 is rotated to the second position, the pair of columnar conductor end portions 3a and 3a protruding outward from the end portion 2a is away from each spring portion 8a of the pair of terminals 8 and 8 for supplying electric power to be in a non-conducting (OFF) state.

SUMMARY

In the conventional vehicle sun visor 1, by pivoting the support shaft 2, the columnar conductor end portion 3a serving as a contact part protruding outward from the end portion 2a of the support shaft 2 and the plate-shaped spring portion 8a serving as a contact part of the terminal 8 assembled to the housing 7a of the connector 7 slide to each other and wear. Therefore, grease is applied to the spring portion 8a of the terminal 8 in order to protect the contact part of the conductor end portion 3a and the spring portion 8a. However, as the grease is gradually removed by the sliding of the contact parts due to repeated rotation of the support shaft 2, when the grease disappears, contact wear occurs and the resistance between the contacts rises, and the contact reliability may be lowered.

The present invention is made to solve this problem, and it is an object of the present invention to provide a vehicle sun visor capable of constantly supplying lubricating oil to prevent contact wear of a contact part of a conductor of an arm and a contact part of a terminal.

A vehicle sun visor according to an aspect of the present invention includes a sun visor body including an electrical component, a non-conductive arm including a cylindrical end portion provided with contact parts of a pair of conductors and rotatably holding the sun visor body, a mounting bracket configured to mount the non-conductive arm to a vehicle, and a connector detachably attached to the mounting bracket and having a pair of terminals configured to supply electric power, each terminal having a contact portion configured to contact each contact part of the contact parts of the pair of conductors. The mounting bracket includes an arm-supporting portion supporting the cylindrical end portion of the non-conductive arm to be rotatable. The contact parts of the pair of conductors are a pair of arcuate-plate-shaped contact parts each formed in an arcuate plate shape. The pair of arcuate-plate-shaped contact parts is provided at a predetermined interval on an outer peripheral surface of the cylindrical end portion, the outer peripheral surface being exposed outside of the arm-supporting portion. The housing of the connector further includes a lubricating oil reservoir being disposed at a position facing to at least one arcuate-plate-shaped contact part of the pair of arcuate-plate-shaped contact parts of the housing of the connector and configured to store lubricating oil to be supplied to the at least one arcuate-plate-shaped contact part.

Each terminal of the pair of terminals may include a spring portion provided with the contact portion. The housing may have a protruding wall provided at a position corresponding to each spring portion and covering each spring portion. The protruding wall may include the lubricating oil reservoir.

The cylindrical end portion exposed outside of the arm-supporting portion may include a small-diameter cylindrical end portion arranged on an upper side of the cylindrical end portion and a large-diameter cylindrical end portion arranged on a lower side of the cylindrical end portion. Further, cutouts may be provided at alternate positions of the small-diameter cylindrical end portion and the large-diameter cylindrical end portion. A first arcuate-plate-shaped contact part of the pair of arcuate-plate-shaped contact parts may be disposed on an outer peripheral surface of the small-diameter cylindrical end portion, and a second arcuate-plate-shaped contact part of the pair of arcuate-plate-shaped contact parts may be disposed on an outer peripheral surface of the large-diameter cylindrical end portion. The lubricating oil reservoir may be provided at a position facing the second arcuate-plate-shaped contact part of the protruding wall and may be configured to store the lubricating oil to be supplied to the second arcuate-plate-shaped contact part.

The pair of arcuate-plate-shaped contact parts may be each provided via a gap at the same height in the extending direction of the non-conductive arms on an outer peripheral surface of the cylindrical end portion which is exposed on the outside of the arm-supporting portion. The lubricating oil reservoir may be provided at a position facing the pair of arcuate-plate-shaped contact parts of the protruding wall and may be configured to store the lubricating oil to be supplied to the pair of arcuate-plate-shaped contact parts.

A vehicle sun visor according to the aspect of the present invention is capable of always suppling lubricating oil from the lubricating oil reservoir provided in the housing of the connector to an arcuate-plate-shaped contact part provided on the outer peripheral surface of the cylindrical end portion of the arm exposed outside of the arm-supporting portion even when the arm is repeatedly rotated with respect to the arm-supporting portion of the mounting bracket, and reliably preventing contact wear due to sliding of the contact part of the conductor of the arm and the contact part of the terminal.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 1:
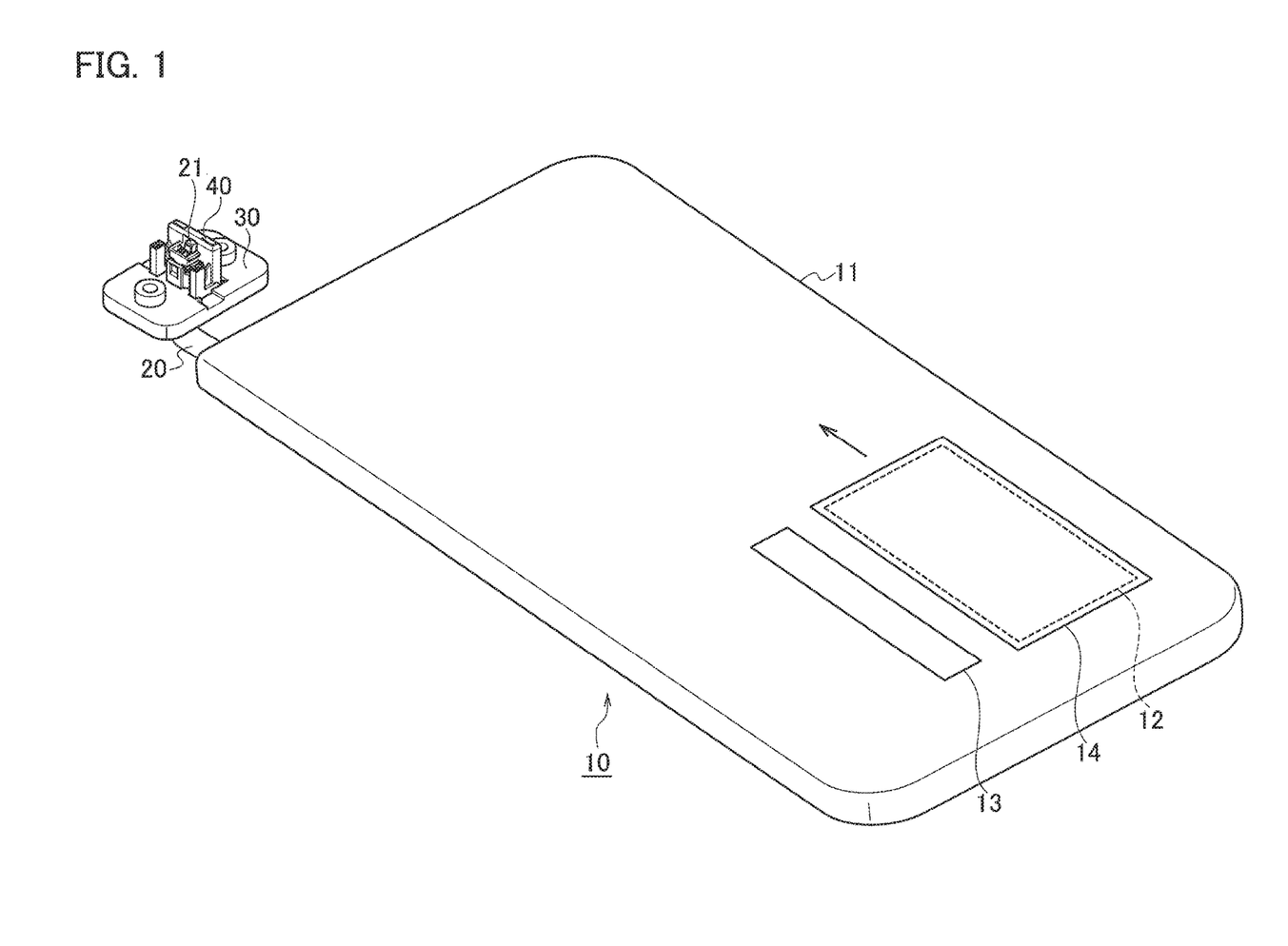
FIG. 1 is a perspective view showing a vehicle sun visor according to a first embodiment of the present invention.
Figure 2:
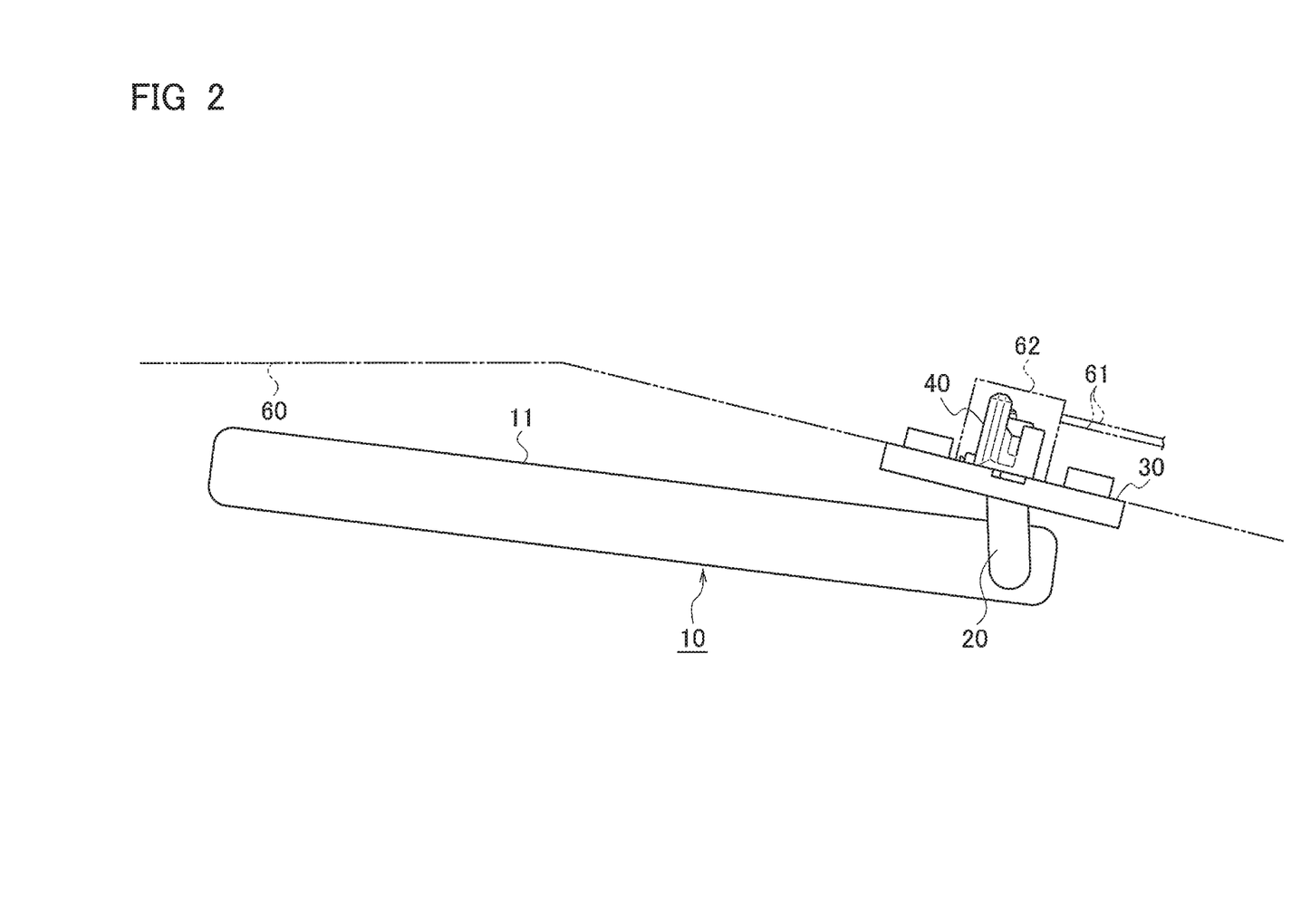
FIG. 2 is a side view showing a state in which the vehicle sun visor is stored toward a ceiling of a cabin.
Figure 3:
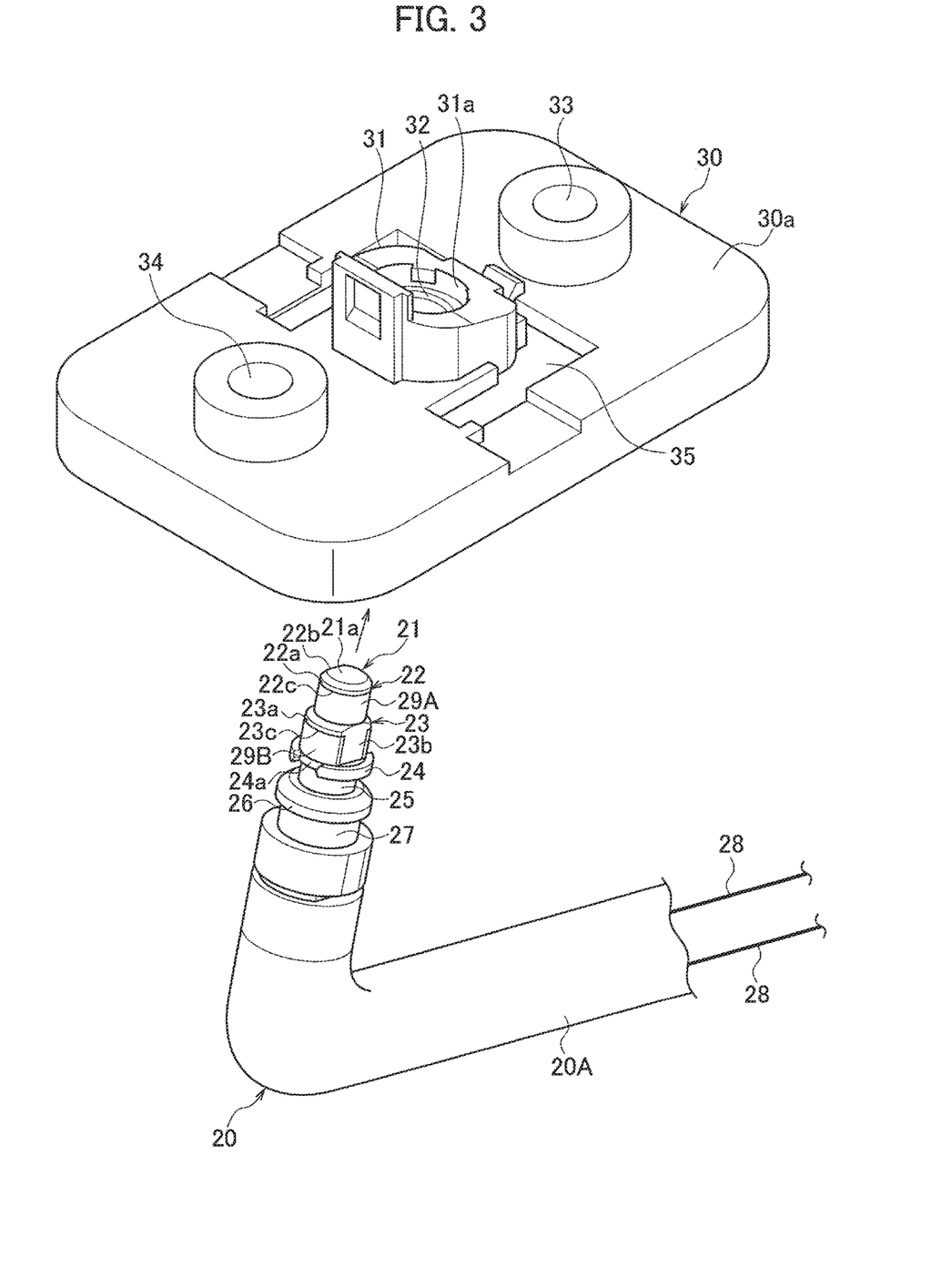
FIG. 3 is a perspective view showing a state before the cylindrical end portion of an arm is press-fitted to a mounting bracket of the vehicle sun visor.
Figure 4:
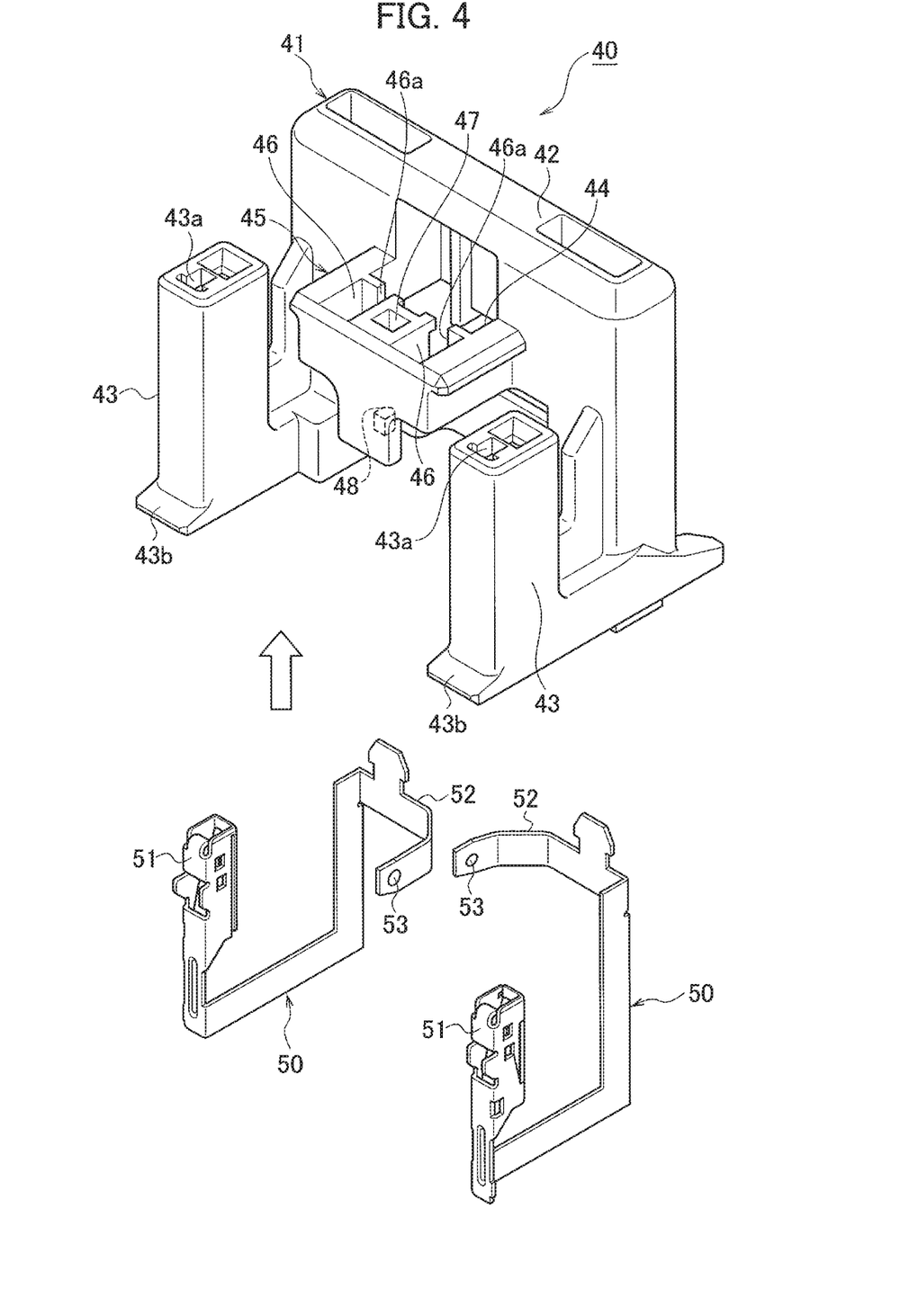
FIG. 4 is a perspective view showing a state before a pair of terminals is inserted into a housing of a connector of the vehicle sun visor.
Figure 5:
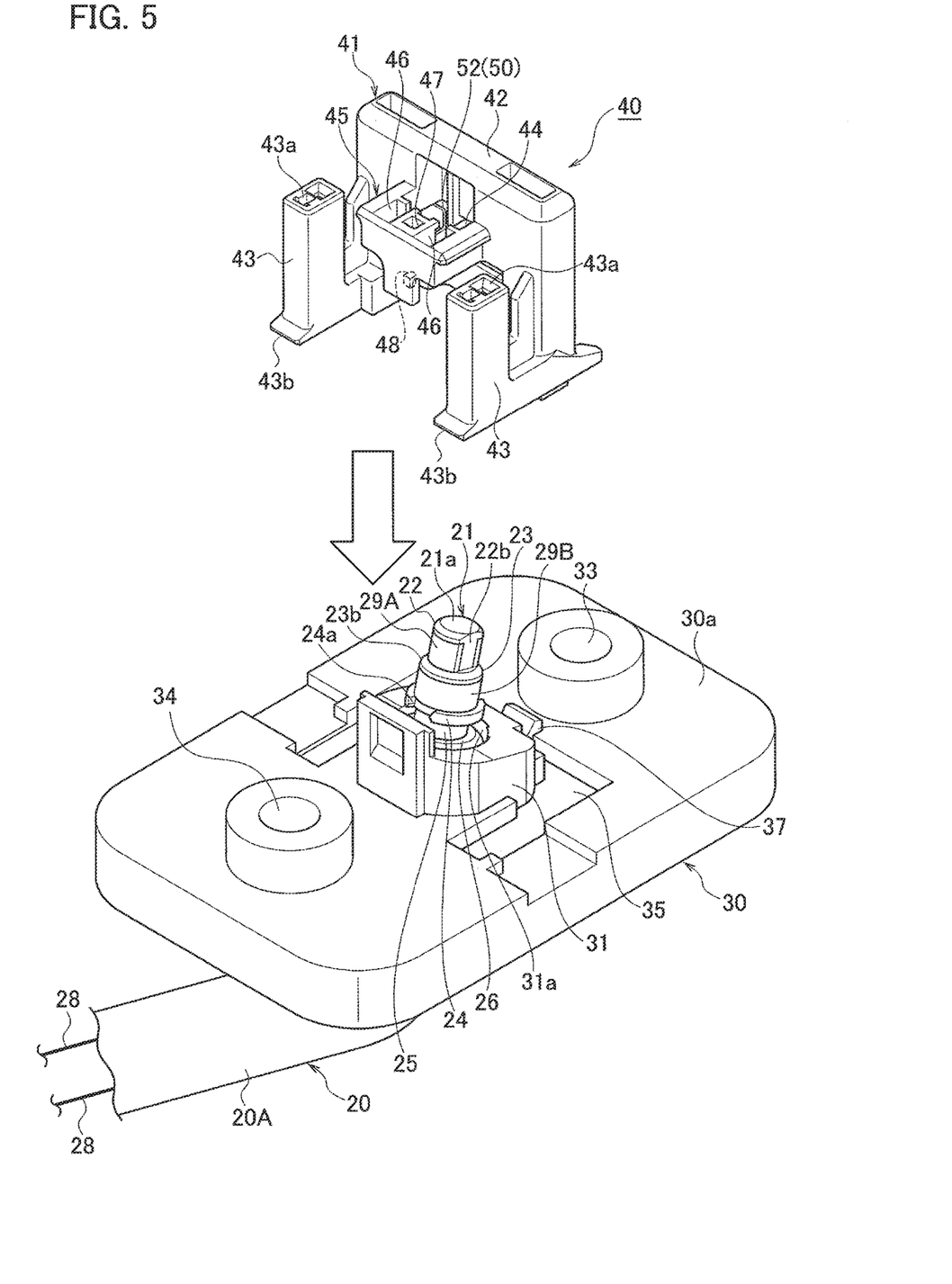
FIG. 5 is a perspective view showing a state before the connector is assembled to the mounting bracket to which the arm is attached.
Figure 6:
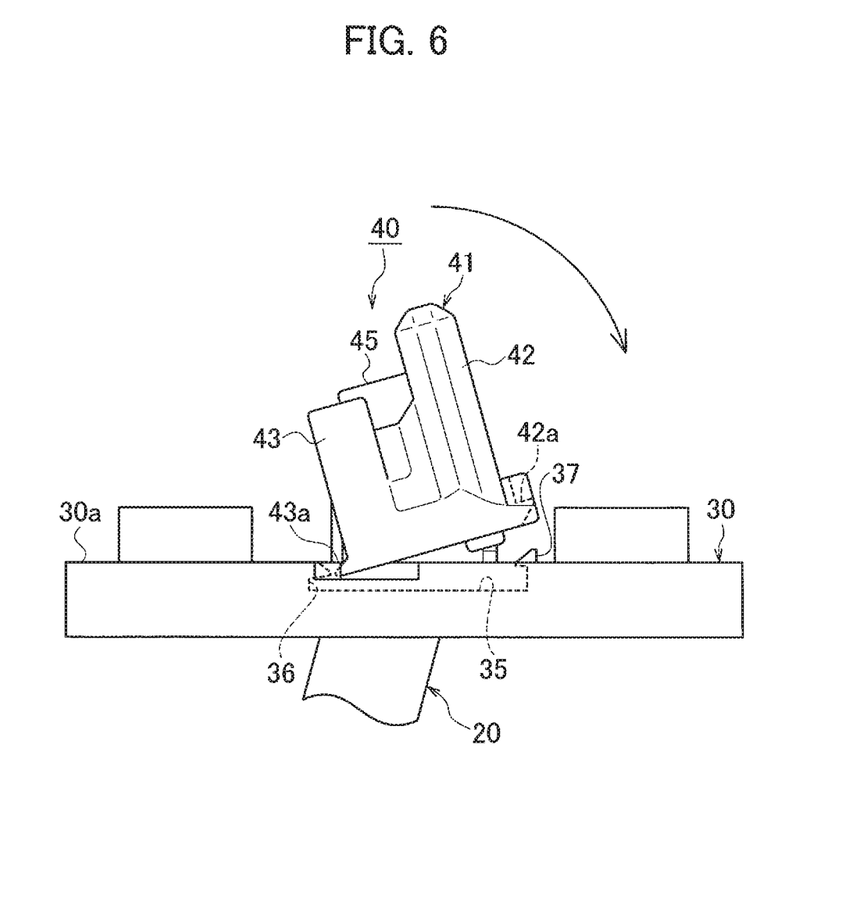
FIG. 6 is a side view showing a state in which the connector is being assembled to the mounting bracket.
Figure 7:
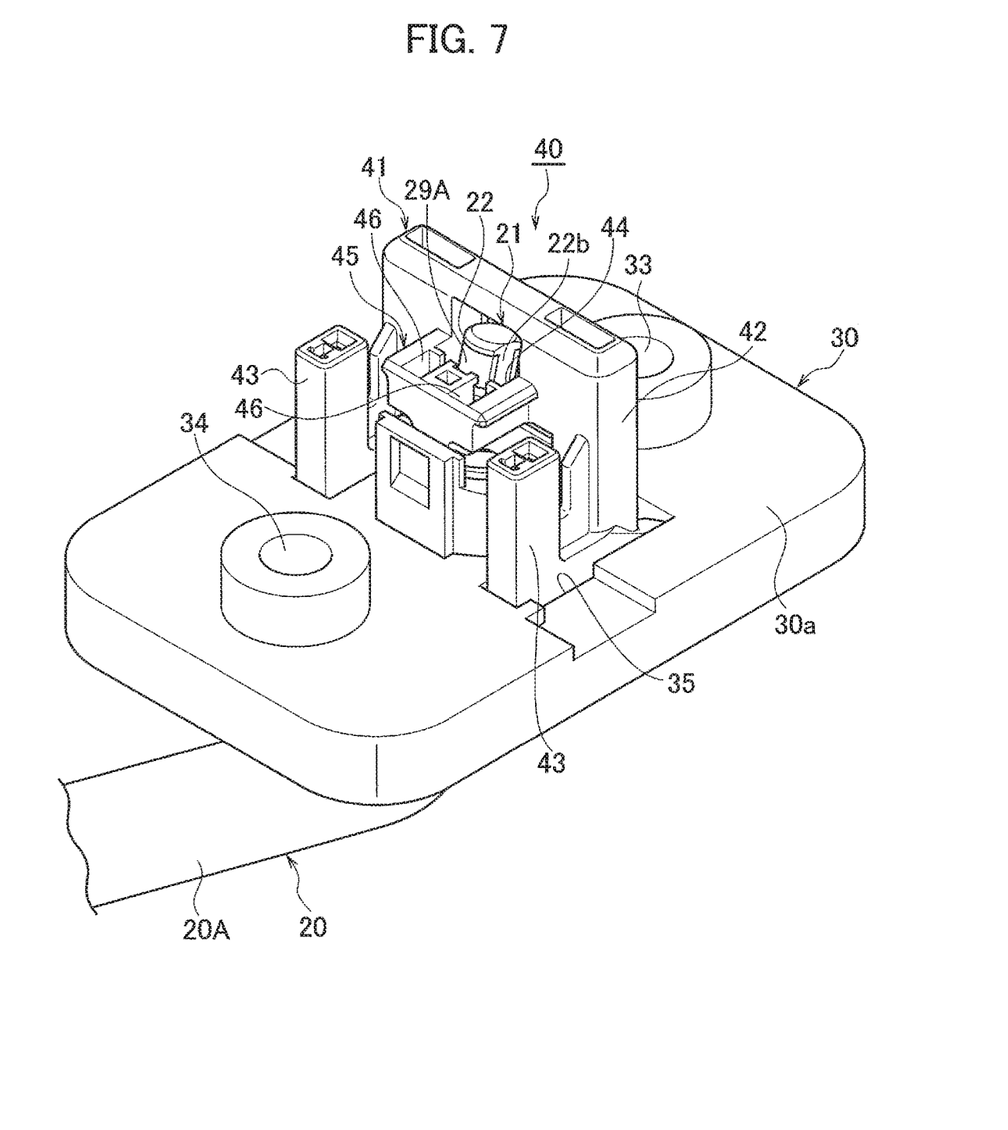
FIG. 7 is a side view showing a state in which the connector has been assembled to the mounting bracket.
Figure 8:
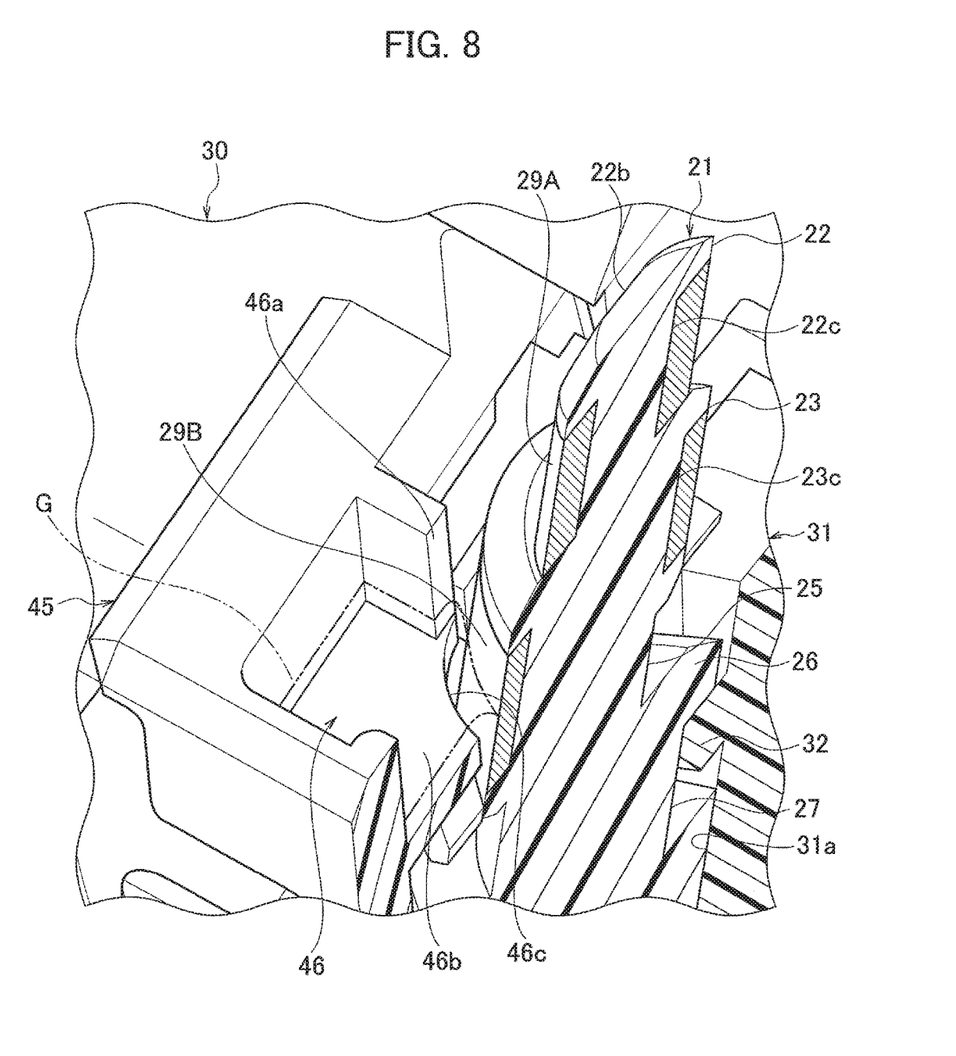
FIG. 8 is a perspective view showing a principal part of the housing of the connector in cross section.

FIG. 1 is a perspective view of a vehicle sun visor according to one embodiment of a first embodiment, FIG. 2 is a side view showing a state in which the vehicle sun visor is stored toward a ceiling of a cabin, FIG. 3 is a perspective view showing a state before the cylindrical-end portion of an arm is press-fitted to a mounting bracket of the vehicle sun visor, FIG. 4 is a perspective view showing a state before a pair of terminals is inserted into a housing of a connector of the vehicle sun visor, FIG. 5 is a perspective view showing a state before the connector is assembled to the mounting bracket to which the arm is attached, FIG. 6 is a side view showing a state in which the connector is being assembled to the mounting bracket, FIG. 7 is a perspective view showing a state in which the connector has been assembled to the mounting bracket, and FIG. 8 is a perspective view showing a principal part of the housing of the connector in cross section.

As shown in FIGS. 1 to 4, the vehicle sun visor 10 includes a sun visor body 11 having a vanity mirror (makeup mirror) 12 and an illumination lamp (electrical equipment) 13, a non-conductive arm 20 rotatably holding the sun visor body 11 and provided with each contact part 29A and 29B of a pair of conductors 28 and 28 at a cylindrical-end portion 21, a mounting bracket 30 for mounting the arm 20 to a roof trim (vehicle) 60, and a connector 40 detachably attached to the mounting bracket 30 and having a pair of terminals 50 and 50 for supplying electric power wherein the terminal has contact portion 53 being in contact with each contact part 29A and 29B of the pair of conductors 28 and 28.

As shown in FIGS. 3, 5, and 7, the arm 20 is formed in a cylindrical shape with a synthetic resin. The arm 20 is formed so that the cylindrical-end portion 21 whose upper surface 21a is closed is inclined at a predetermined angle with respect to an arm body 20A. The pair of conductors 28 and 28 extending in parallel is routed inside the arm 20. The contact parts 29A and 29B of the arm 20 of the pair of conductors 28 and 28 are formed in an arcuate plate shape wherein the contact parts 29A and 29B are exposed toward the cylindrical-end portion 21 of the arm 20 and positioned at the cylindrical-end portion 21 (hereinafter referred to as "a pair of arcuate-plate-shaped contact parts 29A and 29B"). Further, a small-diameter cylindrical-end portion 22 is provided on the upper side of a portion of the cylindrical-end portion 21 of the arm 20 wherein the portion is exposed outside the arm-supporting portion 31 of the mounting bracket 30 described below, and a large-diameter cylindrical-end portion 23 is provided on the lower side of the portion. Cutouts 22b and 23b are provided at alternate positions of the small-diameter cylindrical-end portion 22 and the large-diameter cylindrical-end portion 23, that is, the position of the cutout 22b on the small-diameter cylindrical-end portion 22 and the position of the cutout 23b on the large-diameter cylindrical-end portion 23 are opposed to each other in the diameter direction. First arcuate-plate-shaped contact part 29A, which is one of the pair of arcuate-plate-shaped contact parts 29A and 29B, is arranged in an annular recessed groove portion 22c formed on the outer peripheral surface 22a of the small-diameter cylindrical-end portion 22. Second arcuate-plate-shaped contact part 29B, the other of the pair of arcuate-plate-shaped contact parts 29A and 29B, is arranged in an annular recessed groove portion 23c formed on the outer peripheral surface 23a of the large-diameter cylindrical-end portion 23. A pair of cutouts 22b and 23b positioned alternately between the pair of arcuate-plate-shaped contact parts 29A and 29B is a non-contact area between the pair of arcuate-plate-shaped contact parts 29A and 29B and each contact portion 53 of the pair of terminals 50 and 50.

Further, as shown in FIGS. 3 and 5, an annular flange portion 24 to be engaged with an engaging protrusion 48

(described later) for assembling the connector 40 integrally protrudes and is formed on the lower side of the large-diameter cylindrical-end portion 23. Further, the annular recessed engagement groove 25 is integrally formed on the lower side of the annular flange portion 24. A cutout 24a for guiding the engaging protrusion 48 of the connector 40 is formed in the annular flange portion 24. An annular flange portion 26 having a diameter larger than that of the annular flange portion 24 integrally protrudes and is formed on the lower side of the annular flange portion 24. Further, the annular recessed engagement groove 27 is integrally formed on the lower side of the flange portion 24.

As shown in FIGS. 1 to 3 and FIGS. 5 to 7, the mounting bracket 30 is made of a synthetic resin. A tubular arm-supporting portion 31 having a circular inner peripheral surface 31a rotatably supporting the cylindrical-end portion 21 of the arm 20 is integrally protruded and formed at the center of the mounting bracket 30. As shown in FIGS. 3, 5, and 8, the cylindrical-end portion 21 of the arm 20 is press-fitted to the inner peripheral surface 31a of the arm-supporting portion 31, and a locking protrusion 32 protruding from the inner peripheral surface 31a enters the annular recessed engagement groove 27 of the arm 20, and is engaged with the annular flange portion 26. Accordingly, the upper side of the cylindrical-end portion 21 of the rotating arm 20 protrudes outside the arm-supporting portion 31 such that the upper side is exposed.

As shown in FIG. 5, a recess 35 for assembling the connector is formed on both sides of the arm-supporting portion 31 on the upper surface 30a of the mounting bracket 30 and toward a mounting hole 33 of the mounting bracket 30. An engagement hole 36 into which a locking piece portion 43b of both side walls 43 and 43 of the connector 40 is fitted is formed on both sides of the recess 35 for assembling the connector toward a mounting hole 34, which is opposite the side of the mounting hole 33. In addition, as shown in FIGS. 5 and 6, a locking claw portion 37 to which the locking piece portion 42a of a housing body 42 of the connector 40 is locked is formed at the center of the recess 35 for assembling the connector toward the mounting hole 33. The mounting bracket 30 is screwed to a roof trim 60 by screws (not shown) via a pair of mounting holes 33 and 34.

As shown FIG. 4, a housing 41 of the connector 40 is made of a synthetic resin. This housing 41 includes the housing body 42, a pair of side walls 43 and 43 having a L-shaped terminal receiving chamber 43a on both sides of the housing body 42, and a center wall 45 where a hollow portion 44 is formed between the center wall (protruding wall) 45 and the center of the housing body 42. As shown in FIG. 5, when the housing 41 is assembled in the recess 35 for assembling the connector so that the pair of side walls 43 and 43 of the housing 41 is positioned on both sides of the arm-supporting portion 31 of the mounting bracket 30, as shown in FIG. 7, the cylindrical-end portion 21 of the arm 20 is exposed in the hollow portion 44 between the housing body 42 and the center wall 45.

As shown in FIGS. 4, 5, 7, and 8, a pair of lubricating oil reservoirs 46 and 46 is integrally formed in a box shape at a position facing the arcuate-plate-shaped contact part 29B on the lower side of the center wall 45 of the connector 40 to store paste-like grease (lubricating oil) G to be supplied to the arcuate-plate-shaped contact part 29B on the lower side of the center wall 45. Each lubricating oil reservoir 46 has a lubricating oil supply port 46a for supplying the grease G to the arcuate-plate-shaped contact part 29B on the lower side. An arcuate planar cutout 46c of the bottom wall portion 46h of each lubricating oil reservoir 46 on the lubricating oil supply port 46a side is formed along the arcuate-plate-shaped contact part 29B on the lower side. A certain amount of grease G is continuously supplied to the arcuate-plate-shaped contact part 29B on the lower side through the arcuate planar cutout 46c. Further, in the hollow portion 44 between the housing body 42 and the center wall 45 of the housing 41, a pair of arcuate-plate-shaped contact parts 29A and 29B and spring portions 52 of a pair of terminals 50 and 50 to be described later are arranged facing to each other. That is, since each of the spring portion 52 having the contact portion 53 of the pair of terminals 50 and 50 is covered with the center wall 45 provided with the pair of lubricating oil reservoirs 46 and 46, it is possible to reliably prevent the spring portion 52 of the terminal 50 from being deformed due to an external force.

Further, as shown in FIGS. 4 and 5, a cutout hole 47 having a rectangular cross section is formed between the pair of lubricating oil reservoirs 46 and 46 of the center wall 45. An engaging protrusion 48 for assembling integrally protrudes and is formed on the lower side of the cutout hole 47. If the position of the cylindrical end portion 21 of the arm 20 is not at the correct assembling position, it is impossible to attach the connector 40 to the mounting bracket 30, that is, the engaging protrusion 48 for assembling the housing 41 cannot enter the annular recessed engagement groove 25 of the arm 20 from the cutout 24a of the annular flange portion 24. After assembling the connector 40 to the mounting bracket 30, the engaging protrusion 48 is engaged with the annular flange portion 24 by the rotation of the arm 20, so that the arm 20 is held by the housing 41.

As shown in FIG. 4, each terminal 50 whose distal end is a box-shape mating-terminal connecting part 51 is formed in an L-shaped plate shape and housed in the L-shaped terminal receiving chamber 43a of the side wall 43 of the housing 41. In addition, the L-shaped plate spring portion 52 connected to the mating-terminal connecting part 51 of each terminal 50 is formed to be elastically deformable. In addition, the distal end of each spring portion 52 is provided with the semicircular spherical contact portion 53. Further, the height of each spring portion 52 is different so as to correspond to the upper and lower arcuate-plate-shaped contact parts 29A and 29B.

As shown in FIG. 2, the connector 40 is adapted to be fitted into a connector 62 connected to a power supply connection wire 61 toward the roof trim 60. At the time of this fitting, each mating-terminal connecting part 51 of the pair of terminals 50 and 50 of the connector 40 and the pair of terminals (not shown) of the connector 62 toward the roof trim 60 are electrically connected, and electric power is supplied to the pair of terminals 50 and 50 of the connector 40.

Further, when the sun visor body 11 is folded in front of the front window and when the sun visor body 11 is folded to the side of the side window, the pair of arcuate-plate-shaped contact parts 29A and 29B provided on the outer peripheral surfaces 22a and 23a of the small-diameter and large-diameter cylindrical-end portions 22 and 23 is brought into contact (conducting) with the contact portion 53 of each spring portion 52 of the pair of terminals 50 and 50 for supplying electric power to be in a conducting (ON) state. That is, the conductive circuit connecting the pair of conductors 28 and 28 routed in the arm 20 and the illumination lamp 13 of the sun visor body 11 is in a conducting state, whereby the lighting preparation state of the illumination lamp 13 of the sun visor body 11 is generated. In this lighting preparation state, when a cover (slide member) 14 covering a vanity mirror 12 of the sun visor body 11 is opened by sliding, the switch mechanism (not shown) is turned on, and the illumination lamp 13 is turned on. Generally, when the sun visor body is folded to the side of the side window, the contact part toward the arm is away from the contact portion of the terminal for supplying electric power to becomes non-conductive, so that the conductive circuit of the illumination lamp is in a non-conducting (OFF) state. However, in the first embodiment, even when the sun visor body 11 is folded to the side of the side window, the pair of arcuate-plate-shaped contact parts 29A and 29B contacts each contact portion 53 of the pair of terminals 50 and 50 for supplying electric power, and the conductive circuit of the illumination lamp 13 is in a conducting state except when the connector 40 is assembled to the mounting bracket 30.

According to the vehicle sun visor 10 of the first embodiment as described above, when the vehicle sun visor 10 is assembled, first, as shown in FIG. 3, the cylindrical-end portion 21 of the arm 20 is press-fitted to a circular inner peripheral surface 31a formed obliquely in the arm-supporting portion 31 of the mounting bracket 30. By this press-fitting, as shown in FIGS. 3, 5, and 8, the locking protrusion 32 protruding from the inner peripheral surface 31a of the arm-supporting portion 31 enters the annular recessed engagement groove 27 of the arm 20, and is engaged with the annular flange portion 26, and the cylindrical-end portion 21 of the arm 20 is rotatably supported on the arm-supporting portion 31.

Next, as shown in FIGS. 4 and 5, after the pair of terminals 50 and 50 is inserted into the housing 41 of the connector 40, as shown in FIG. 5, cutouts 22b and 23b of the small-diameter and large-diameter cylindrical-end portion 22 and 23 of the arm 20, wherein the small-diameter and large-diameter cylindrical-end portion 22 and 23 is exposed outside the arm-supporting portion 31 of the mounting bracket 30, is positioned to be faced with the both side walls 43 and 43 of the connector 40. In this state, as shown in FIG. 6, the pair of locking piece portions 43b and 43b provided on the both side walls 43 and 43 of the housing 41 of the connector 40 is inserted into the pair of engagement holes 36 and 36 provided in the recess 35 for assembling the connector wherein the recess is provided on the upper surface 30a of the mounting bracket 30, and the connector 40 is rotated to lock the locking piece portion 42a of the housing body 42 of the connector 40 to the locking claw portion 37 of the recess 35 for assembling the connector, as shown by the arrow in FIG. 6, so that the connector 40 is attached to the upper surface 30a of the mounting bracket 30.

At this time, each spring portion 52 having the contact portion 53 of the pair of terminals 50 and 50 assembled to the housing 41 of the connector 40 passes the vicinity of the cutouts 22b and 23b of the small-diameter and large-diameter cylindrical-end portions 22 and 23 of the cylindrical-end portion 21 of the arm 20. Therefore, the connector 40 can be assembled to the mounting bracket 30 while each spring portion 52 does not contact the pair of arcuate-plate-shaped contact parts 29A and 29B on the outer peripheral surfaces 22a and 23a of the small-diameter and large-diameter cylindrical-end portions 22 and 23. As a result, there is no interference between the pair of arcuate-plate-shaped contact parts 29A and 29B and the contact portion 53 of each spring portion 52 of the pair of terminals 50 and 50, and deformation of each spring portion 52 of the pair of terminals 50 and 50 can be reliably prevented.

The arcuate-plate-shaped contact parts 29A and 29B are provided on the outer peripheral surface 22a of the small-diameter cylindrical-end portion 22 on the upper side of the arm 20 exposed outside the arm-supporting portion 31 of the mounting bracket 30 and the outer peripheral surface 23a of the large-diameter cylindrical-end portion 23 on the lower side of the arm 20 exposed outside the arm-supporting portion 31 of the mounting bracket 30, so that it is possible to widen the contact range (rotation angle of the arm 20) between the arcuate-plate-shaped contact parts 29A and 29B serving as the contact part of the conductor 28 of the arm 20 and the contact portion 53 of the terminal 50. As shown in FIG. 2, when the sun visor body 11 is stored toward the roof trim 60 and when the sun visor body 11 is folded in front of the front window, and when the sun visor body 11 is folded to the side of the side window, the pair of arcuate-plate-shaped contact parts 29A and 29B of the arm 20 and each contact portion 53 of the pair of terminals 50 and 50 can be in a contacting state.

Further, as shown in FIG. 8, at the position facing the outer peripheral surface 23a of the large-diameter cylindrical end portion 23 of the cylindrical end portion 21 of the arm 20 of the center wall 45 of the connector 40, the pair of lubricating oil reservoirs 46 and 46 for storing paste-like grease (lubricating oil) G to be supplied to the arcuate-plate-shaped contact part 29B provided on the outer peripheral surface 23a of the large-diameter cylindrical end portion 23. As a result, paste-like grease G with which each lubricating oil reservoir 46 filled is supplied to the arcuate-plate-shaped contact part 29B and adheres to the contact portion 53 of the terminal 50. Therefore, it is possible to protect both the contact part 29B and the contact portion 53 from wearing due to sliding. That is, the paste-like grease G stored in the lubricating oil reservoir 46 is constantly in contact with the arcuate-plate-shaped contact part 29B and even if the arm 20 repeatedly rotates, the grease G surely adheres to the contact portion 53 of the terminal 50. Thus, absence of grease G (grease out) will not occur due to sliding. That is, the grease G is constantly supplied between the arcuate-plate-shaped contact part 29B and the contact portion 53, and sliding abrasion between the contact part 29B and the contact portion 53 can be surely prevented.

Further, after assembling the connector 40 to the mounting bracket 30, the grease G is put into the lubricating oil reservoir 46. Therefore, there is no concern that the grease G adheres to other parts at the time of assembling parts. In addition, the replenishment amount of the grease G is constant, and it is easy to determine whether the grease G is in contact with the arcuate-plate-shaped contact part 29B of the arm 20.

Further, the center wall 45 integrally protrudes from the housing 41 of the connector 40 at a position where the respective spring portions 52 having the contact portion 53 so as to cover the pair of spring portions 52 and 52. Since the pair of spring portions 52 and 52 is covered by the center wall 45 in this way, it is possible to easily and reliably prevent the deformation of the spring portion 52 due to the external force.

Figure 9:
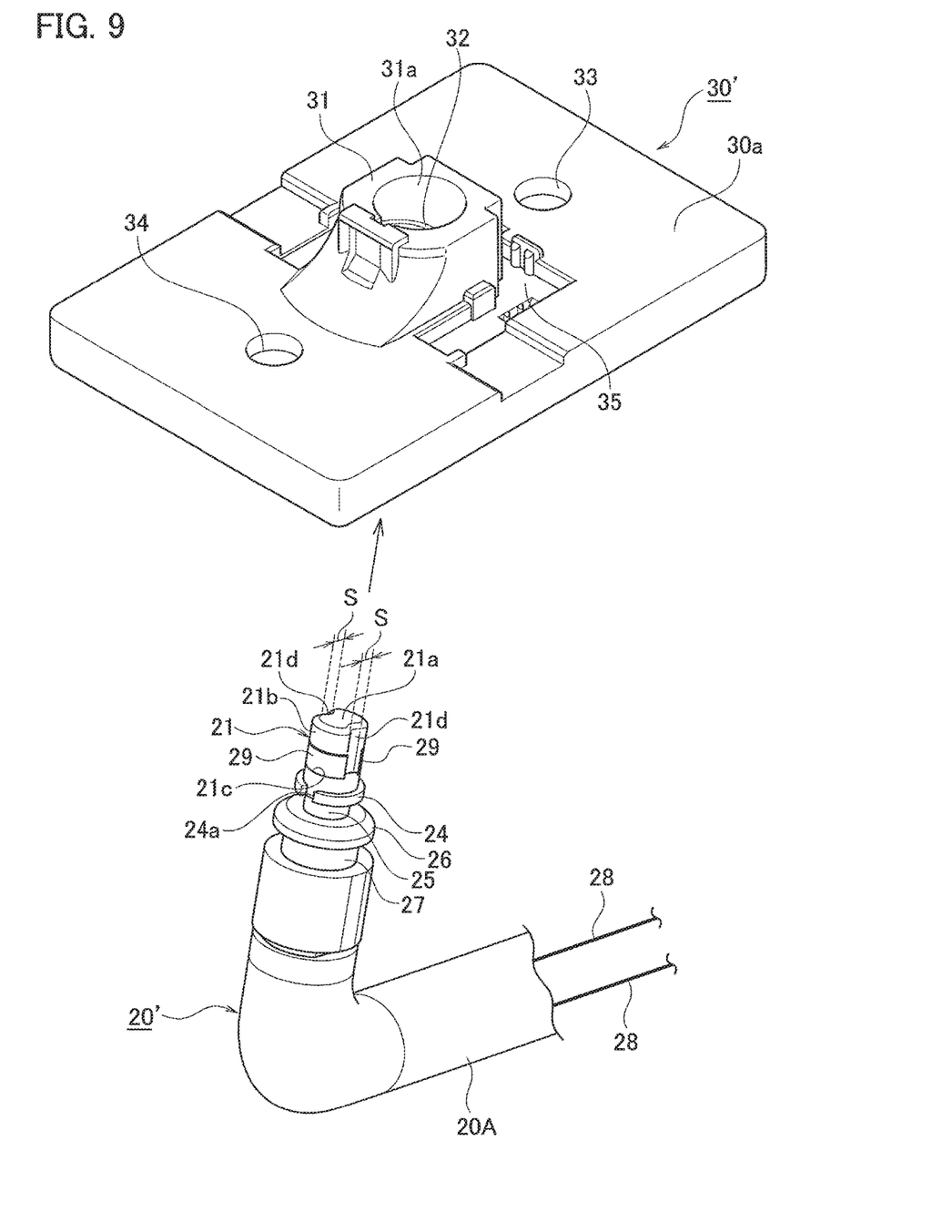
FIG. 9 is a perspective view showing a state before a cylindrical end portion of the arm is press-fitted to a mounting bracket of the vehicle sun visor according to a second embodiment of the present invention.
Figure 10:
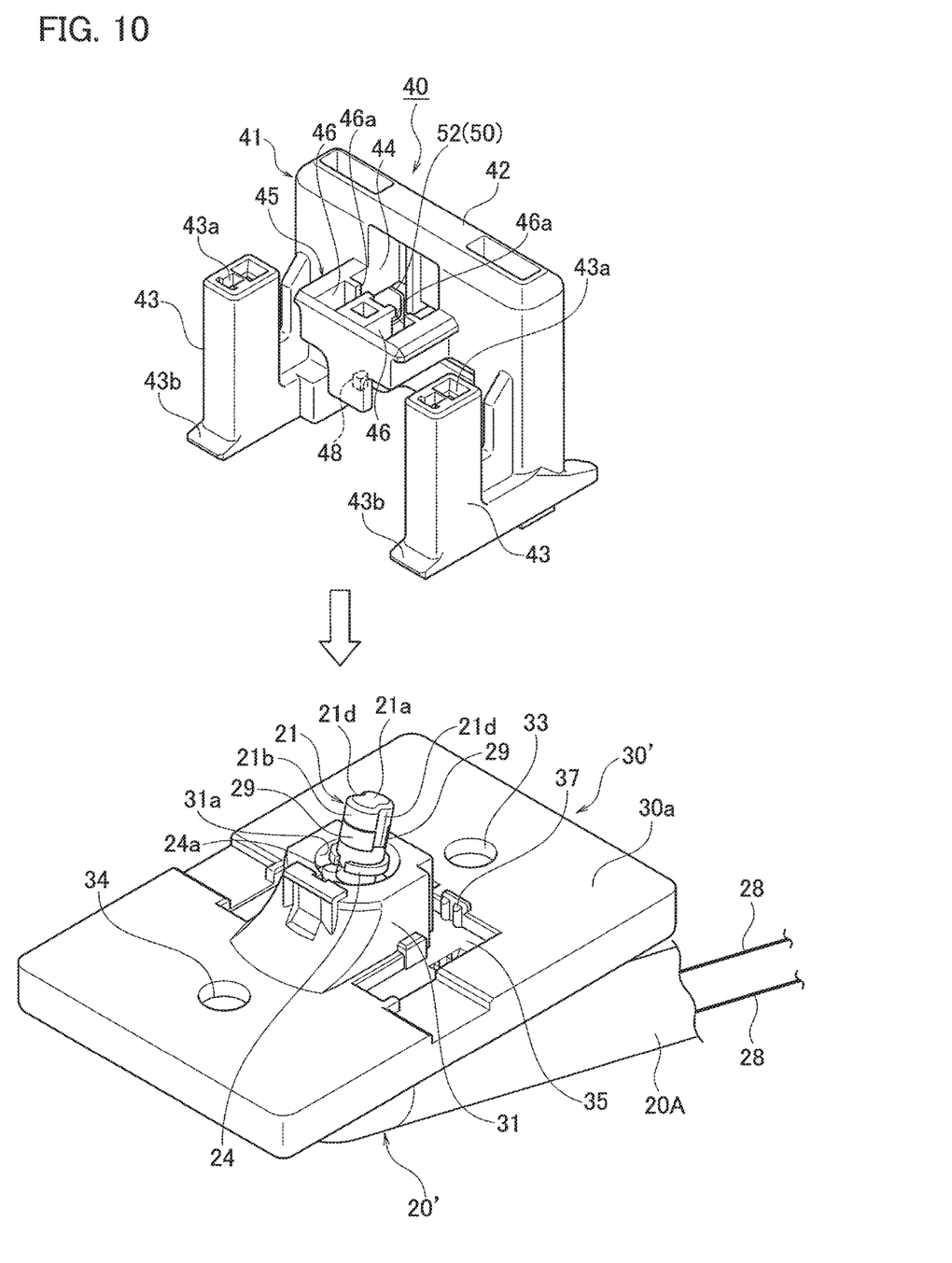
FIG. 10 is a perspective view showing a state before the connector is assembled to the mounting bracket to which the arm according to the second embodiment of the present invention is attached.

FIG. 9 is a perspective view showing a state before a cylindrical end portion of the arm is press-fitted to a mounting bracket of the vehicle sun visor according to a second embodiment of the present invention. FIG. 10 is a perspective view showing a state before the connector is assembled to the mounting bracket to which the arm is attached.

As shown in FIGS. 9 and 10, an annular recessed groove portion 21c is formed at the center of the outer peripheral surface 21b of cylindrical end portion 21, which is exposed outside of an arm-supporting portion 31 of the mounting bracket 30' of the arm 20', which will be described later. In the annular recessed groove portion 21c, the pair of arcuateplate-shaped contact parts 29 and 29 positioned on the ends of the pair of conductors 28 and 28 is arranged at the same height in the direction in which the arm 20' extends with a predetermined gap (interval) S. The pair of gaps S and S has respective arcuate recessed groove portions 21d formed therein, and each arcuate recessed groove portion 21d is a non-contact region between the pair of arcuate-plate-shaped contact parts 29 and 29 and each contact portion 53 of the pair of terminals 50 and 50. Further, the spring portions 52 of the pair of terminals 50 and 50 are positioned at the same height position so as to correspond to the pair of arcuate-plate-shaped contact parts 29 and 29. Paste-like grease (lubricating oil) G is always supplied to the pair of arcuate-plate-shaped contact parts 29 and 29 from a pair of box-like lubricating oil reservoirs 46 and 46 formed in the center wall 45 of the connector 40 housing 41. Since other configurations are similar to those of the first embodiment, the same components are denoted by the same reference numerals, and a detailed description thereof will be omitted.

According to the second embodiment, since the paste-like grease G with which the pair of lubricating oil reservoirs 46 and 46 of the center wall 45 of the connector 40 is filled is always supplied to the pair of arcuate-plate-shaped contact parts 29 and 29 to adhere to the respective contact portions 53 of the pair of terminals 50 and 50, it is possible to protect both the contact part 29 and the contact portion 53 from abrasion due to sliding. That is, as in the first embodiment, even if the arm 20 is repeatedly rotated, the grease G surely adheres to the contact portions 53 of the pair of terminals 50 and 50, so that the grease G does not disappear by sliding. That is, the grease G is always supplied between the pair of arcuate-plate-shaped contact parts 29 and 29 and the respective contact portions 53 of the pair of terminals 50 and 50 to reliably prevent sliding abrasion between the contact part 29 and the contact portion 53.

According to each of the above embodiments, the sun visor body is provided with an illumination lamp as an electrical component. The sun visor body may be provided with a compact and thin liquid crystal monitor or the like as an electrical component.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A vehicle sun visor comprising:
    a sun visor body including an electrical component;
    a non-conductive arm including a cylindrical end portion provided with contact parts of a pair of conductors and rotatably holding the sun visor body;
    a mounting bracket configured to mount the non-conductive arm to a vehicle; and
    a connector detachably attached to the mounting bracket and having a pair of terminals configured to supply electric power, each terminal having a contact portion configured to contact each contact part of the contact parts of the pair of conductors,
    wherein the mounting bracket includes an arm-supporting portion supporting the cylindrical end portion of the non-conductive arm to be rotatable,
    wherein the contact parts of the pair of conductors are a pair of arcuate-plate-shaped contact parts each formed in an arcuate plate shape,
    wherein the pair of arcuate-plate-shaped contact parts is provided at a predetermined interval on an outer peripheral surface of the cylindrical end portion, the outer peripheral surface being exposed outside of the arm-supporting portion, and
    wherein the housing of the connector further comprises a lubricating oil reservoir being disposed at a position facing to at least one arcuate-plate-shaped contact part of the pair of arcuate-plate-shaped contact parts of the housing of the connector and configured to store lubricating oil to be supplied to the at least one arcuate-plate-shaped contact part.

2. The vehicle sun visor according to claim 1,
    wherein each terminal of the pair of terminals includes a spring portion provided with the contact portion,
    wherein the housing has a protruding wall provided at a position corresponding to each spring portion and covering each spring portion, and
    wherein the protruding wall includes the lubricating oil reservoir.

3. The vehicle sun visor according to claim 2,
    wherein the cylindrical end portion exposed outside of the arm-supporting portion comprises a small-diameter cylindrical end portion arranged on an upper side of the cylindrical end portion and a large-diameter cylindrical end portion arranged on an lower side of the cylindrical end portion,
    wherein cutouts are provided at alternate positions of the small-diameter cylindrical end portion and the large-diameter cylindrical end portion,
    wherein a first arcuate-plate-shaped contact part of the pair of arcuate-plate-shaped contact parts is disposed on an outer peripheral surface of the small-diameter cylindrical end portion, and a second arcuate-plate-shaped contact part of the pair of arcuate-plate-shaped contact parts is disposed on an outer peripheral surface of the large-diameter cylindrical end portion, and
    wherein the lubricating oil reservoir is provided at a position facing the second arcuate-plate-shaped contact part of the protruding wall and configured to store the lubricating oil to be supplied to the second arcuate-plate-shaped contact part.

4. The vehicle sun visor according to claim 1,
    wherein the pair of arcuate-plate-shaped contact parts is each provided via a gap at the same height in the extending direction of the non-conductive arms on an outer peripheral surface of the cylindrical end portion which is exposed on the outside of the arm-supporting portion, and
    wherein the lubricating oil reservoir is provided at a position facing the pair of arcuate-plate-shaped contact parts of the protruding wall and configured to store the lubricating oil to be supplied to the pair of arcuate-plate-shaped contact parts.

* * * * *